United States Patent [19]

Hilakos

[11] Patent Number: 4,728,387
[45] Date of Patent: Mar. 1, 1988

[54] RESIN IMPREGNATION OF FIBER STRUCTURES

[75] Inventor: William Hilakos, Mt. Vernon, Ind.

[73] Assignee: General Electric Company, Mt. Vernon, Ind.

[21] Appl. No.: 941,653

[22] Filed: Dec. 15, 1986

[51] Int. Cl.⁴ .............................................. B32B 17/04
[52] U.S. Cl. ..................................... 156/441; 156/166; 156/180; 156/296; 156/494; 156/500; 156/549; 156/551; 57/1 UN; 57/2.3; 57/297; 118/56; 118/123; 118/411; 118/420
[58] Field of Search .............. 156/166, 180, 296, 433, 156/441, 494, 549, 551; 118/56, 123, 410, 411, 420; 57/1 UN, 2.3, 2.5, 297

[56] References Cited

U.S. PATENT DOCUMENTS

| | | | |
|---|---|---|---|
| 2,730,455 | 1/1956 | Swann | 118/123 |
| 3,144,025 | 8/1964 | Erlich | 156/180 |
| 3,154,908 | 11/1964 | Cilker et al. | 156/166 |
| 3,422,796 | 1/1969 | Baber | 118/411 |
| 3,779,844 | 12/1973 | Dorsch | 118/420 |
| 3,798,095 | 3/1974 | Hall | 156/180 |
| 3,827,397 | 8/1974 | Hebberling et al. | 118/420 |
| 4,285,749 | 8/1981 | Stiles | 156/166 |
| 4,289,558 | 9/1981 | Eichenbaum et al. | 156/441 |
| 4,329,838 | 5/1982 | Zerle et al. | 57/1 UN |

FOREIGN PATENT DOCUMENTS 45-21254  5/1970  Japan ................................ 57/1 UN

*Primary Examiner*—Caleb Weston
*Attorney, Agent, or Firm*—Joseph T. Eisele; Martin B. Barancik

[57] ABSTRACT

An embodiment assembly for the impregnation of a continuous length of fibers comprises a convex surface and a non-convex surface over which the length of fibers is drawn under tension. The pressure of impingement on the surfaces alternately separates and consolidates the fibers in sequence during their impregnation with the resin, to obtain a complete and homogeneous impregnation.

9 Claims, 5 Drawing Figures

RESIN IMPREGNATION OF FIBER STRUCTURES

BACKGROUND OF THE INVENTION

1. Field of the Invention

The invention relates to methods and apparatus for impregnating continuous lengths of fiber structures with polymeric resins.

2. Brief Description of the Prior Art

A wide variety of methods and devices have been proposed for impregnating structures composed of textile fibers, with polymeric resins; see for example the U.S. Pat. No. 3,413,186 which describes the impregnation of glass fibers. In general, one of the problems faced by the artisan has been the achievement of a product wherein the multitude of individual fibers such as glass fibers is completely wetted and encapsulated with the resin impregnant so as to eliminate air pockets or voids between fibers. Unless this is accomplished, fibers will be in physical contact with each other and free to abrade, one upon the other. This of course leads to a reduced life for the structure made up of the fibers. The assembly of the present invention provides a means of completely wetting and impregnating a continuous length of textile fibers with a polymeric resin.

SUMMARY OF THE INVENTION

The invention comprises an assembly for impregnating a continuous length of fibers with a polymeric resin, which comprises;

means for receiving and guiding the continuous length of fibers into the assembly;

a die, through which the impregnated length is discharged from the assembly;

a pathline between the means for receiving and the die, over which the continuous length of fibers is free to travel;

means for tracting a continuous length of fibers, under tension and along the pathline;

a convex surface positioned on the pathline, said surface having a contact point, upon which a continuous length of fibers tracted along the pathline will impinge against;

said pathline changing direction at said contact point, towards the convex surface so that a continuous length of fibers tracted under tension along the pathline is forced against the convex surface at the contact point, whereby the fibers are spread apart adjacent to the convex surface; and means for applying a polymeric resin to the continuous length of fibers at a point where the fibers are spread apart.

The invention also comprises the use of the assembly of the invention to impregnate continuous lengths of textile fibers with a polymeric resin.

The assembly of the invention is useful to impregnate a wide variety of fiber structures such as yarns of high-temperature resistant fibers (such as carbon polyaramid and the like). The assembly is particularly useful to impregnate glass fibers.

The term "glass fibers" is used herein to mean fibers of a glass composition in the form of filaments, strands, yarns, bundles, cords and the like; said fibers including cut, chopped or discontinuous fiber lengths as well as continuous filaments. The continuous lengths of glass fibers impregnated in accordance with the present invention may be untreated or treated with anchoring agents or the like to improve bonding to the polymeric resin impregnants.

DETAILED DESCRIPTION OF THE PREFERRED EMBODIMENTS OF THE INVENTION

Those skilled in the art will gain an appreciation of the invention from a reading of the following description of the preferred embodiments, in conjunction with a viewing of the accompanying drawings of FIGS. 1-5, inclusive.

Figure 1:
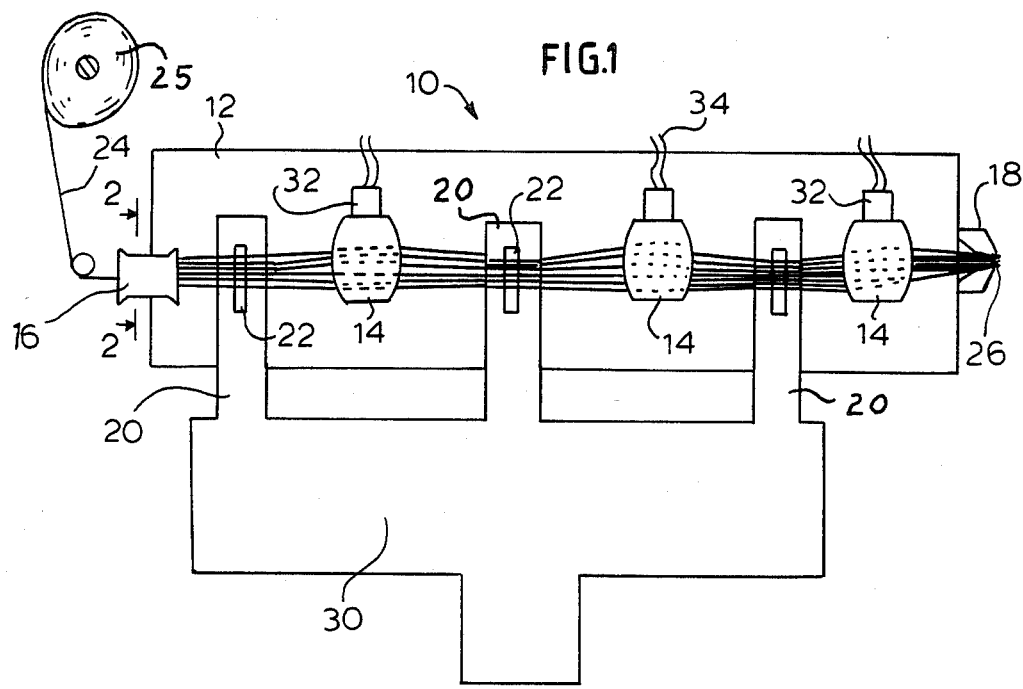
FIG. 1 is a top view of a preferred embodiment assembly of the invention.

Referring first to FIG. 1 there is seen an assembly 10 of the invention. The assembly 10 comprises a base member 12 upon which there is mounted in line, a glass strand inserting nozzle 16 and a die 18. In the following description, glass strand 24 is referred to but any continuous length of fibers (non-glass) may be impregnated in the assembly 10. A plurality of convex first surfaces 14 are mounted on the base member 12 between nozzle 16 and die 18. In line with and preceding each convex surface 14 is a second non-convex surface 20. The convex surfaces 14 and the non-convex surfaces 20 may be fixed surfaces or they may be endless rotating surfaces, movable with or counter to strand 24. Preferably the endless surfaces 14 rotate freely on a shaft beneath the moving strand 24 in the direction of the strand 24.

In operation, a structure such as a strand 24 of glass fibers is passed through the assembly 10, entering through nozzle 16. The strand 24 passes under the tension of traction from a source such as a supply roll 25 to a pick-up roll (not seen in FIG. 2) beyond die 18. Sufficient tension is required to press the continuous length against the convex surfaces described below to achieve a spreading of the glass fibers. Generally a tension insufficient to break the continuous length but sufficient to spread fibers in the length is employed. The optimum tension to accomplish these objectives will depend of course on the nature and strength of the fibers and the length.

Figure 2:
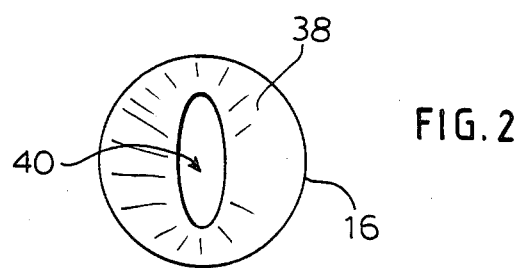
FIG. 2 is an enlarged view along lines 2—2 of the component 16 as shown in FIG. 1.

As shown in FIG. 2, a view along lines 2—2 of FIG. 1, the insertion nozzle 16 comprises a hollow body 38 pierced by an oval-shaped passage 40. As the substantially round strand 24 passes through the oval passage 40 into the assembly 10, the strand is shaped into a fan, spreading the glass fibers as shown in FIG. 1. The passage 40 is dimensioned to receive the strand 24 in sliding engagement so as to shape the strand 24 into the fanned configuration as it passes into the assembly 10.

During passage through the assembly 10, the fan-shaped strand 24 under the tension of traction follows a tortuous path, changing direction at the point of contact with the convex surfaces 14 and with the second surfaces 20. This change of direction presses the strand 24 against the surfaces 14,20 at the surface contact point. This will be appreciated by referring to FIG. 3, a side view of the assembly 10 of the invention shown in FIG.

1. Each of the surfaces 14,20 have a strand 24 contact point. The contact point 15 on each convex surface 14 is on a straight line which is perpendicular to and touching the convex surface at the contact points 15. Each surface 20 has a contact point 21 on a straight line, which is perpendicular to and touching the surface 20 at the contact point 21. The contact points 15,21 are each on a pathline upon which the strand 24 is free to travel between nozzle 16 and die 18. As may be seen in FIG. 2, the pressure of the strand 24 against the convex surfaces 14 at contact points 15 causes a separation of the glass fibers making up strand 24, at the aforementioned contact points 15. As the strand 24 passes over the contact points 21 on the second surfaces 20, the pressure of the strand 24 on the surface 20 consolidates the separated glass fibers in the strand 24. The alternating separating and consolidation of the fibers as they pass through the assembly 10 opens and closes; i.e.; works the strand 24 so that access to individual glass fibers by a liquid application on the strand 24 is achieved. The individual fibers may be completely coated and encapsulated. Any number of alternating convex and nonconvex surfaces may be employed in the assembly 10 so that a thorough working of the glass fibers (spreading and reconsolidation) is achieved.

In the assembly 10, a liquid polymeric resin impregnant or a polymeric resin forming composition is applied to the strand 24 at the point of contact with the second surfaces 20 through injection nozzles 22 although application may be made at any other point or points (including adjacent to surfaces 14) followed by the spreading and consolidation (working) of the strand 24. The resin may be applied from a single side of the spread fibers (as shown in FIG. 1) or from both sides of the pathline. The injection nozzles 22 are supplied with resin or a resin forming impregnant from a source such as a thermoplastic resin extruder 30.

Working of the strand 24 after application of the impregnant as described above achieves a thorough wetting of the individual fibers, with substantial elimination of impregnant voids. When the resin is a thermoplastic resin, the assembly 10 of the invention advantageously includes a means of maintaining thermoplasticity of the resin during working of the glass fibers. For example as shown in FIG. 1, heater elements 32 are associated with the convex surfaces 14 for the purpose of maintaining a predetermined thermoplastic temperature of the strand at the contact point 15 with strand 24. Heat may be applied to any point or points within the assembly 10 to maintain thermoplasticity of the applied resin, including at the surface 20 or between surfaces 14 and 20. The heater elements 32 may be any conventional heating means for maintaining the resin at a predetermined temperature, including an element thermally energized by a heated fluid including gas or liquid heat transfer mediums. Conveniently, the heater elements 32 are electrically energized resistance heaters, energized by an electrical source (not shown in FIG. 1) by connection thereto through an electrical conductor 34. Thermocouples and temperature sensors can be associated with the heater means (as known in the art) for energizing or de-energizing the heater means so that predetermined temperatures may be maintained. In this way, the temperature of the resin on strand 24 can be maintained at a range promoting the flow of the applied resin around the individual fibers making up the strand 24 during its working.

Figure 3:
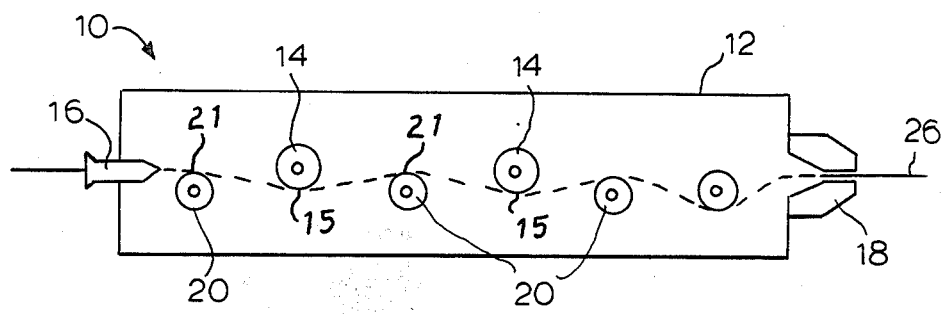
FIG. 3 is a side view of the assembly shown in FIG. 1.
Figure 4:
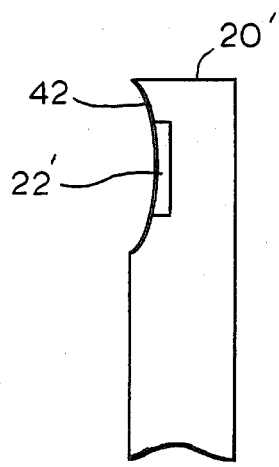
FIG. 4 is an enlarged view of an alternate component 16 concave surface.

The surfaces 20 shown in the FIGS. 1 and 3 described above are part of a cylinder and the contact points 21 lie on the arc of the cylinder so that in essence the spread apart strand 24 lies in a straight line along the surface 20 at contact point 21. However, in an alternate embodiment assembly 10 of the invention, the second surface 20 may be concave in shape. FIG. 4 is a side view of an alternate surface 20' with an associated resin injection nozzle 22' positioned at a strand contacting point 42. The contact point 42 lies on the arc of the concavity so that when the strand 24 passes over it (and the strand 24 is pressed against the point 42 of surface 20' by the tension and change of direction made upon the strand 24 as previously described in connection with surface 20) there is an enhancement of the consolidation of the previously separated glass fibers. This enhancement increases the working of the glass fibers to promote a more complete resin impregnation of strand 24.

The pathline of strand 24 through the assembly 10 is a tortured one in that it changes direction toward the center of the arc of the convex surfaces 14 at the contact points 15, at an angle acute to the perpendicular line upon which the contact points 15 lie. The pathline of strand 24 also changes direction way from the center of the contact points 21 or surfaces 20, at an angle acute to the perpendicular lines upon which the contact points 21 lie as described above. These changes of direction as the strand 24 passes through the assembly 10 exert a pressure upon the traveling strand 24 at each contact point 15,21, since the strand 24 is under tension as previously described.

Figure 5:
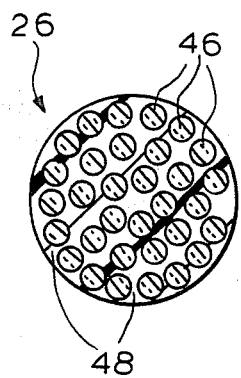
FIG. 5 is a cross-sectional view of a product, resin impregnated glass fiber strand.

The impregnated strand 26 is discharged from the assembly 10 through a die 18 which removes excess impregnant from the surface of strand 24 and finally consolidates the glass fibers into a dimensionally stable, resin impregnated strand 26. As shown in FIG. 5, a cross-sectional end view of the strand 26, individual glass fibers 46 are encapsulated in a matrix of resin 48.

The assembly 10 described above may be used to homogeneously impregnate glass fibers structured in a continuous length, with a wide variety of polymeric resins such as synthetic and natural resin elastomers, thermosetting resins and synthetic, thermoplastic polymeric resins such as polyolefins, polyurethanes, polyamides, polycarbonates and the like. Resin forming compositions may also be impregnated into the glass fibers and the resins formed in-situ by known methods. For example, polyurethane elastomer precursors (a polyisocyanate and a polyol or a polyurethane prepolymer) together with a reaction catalyst and/or an extender may be impregnated into a glass strand structure and curing allowed to occur for the in-situ formation of a polyurethane impregnant. The insitu preparation of such elastomers is well known; see for example the U.S. Pat. No. 4,008,197. The assembly of the invention is particularly useful to impregnate glass fibers with thermoplastic resins, under sufficient heat to liquify (thermoplasticize) the resin.

The following Examples describe the manner and the process of making and using the invention and set forth the best mode contemplated by the inventor for carrying out the invention.

EXAMPLE 1

Apparatus is provided meeting the description of the assembly 10 shown in the accompanying drawings. The die component has a die orifice of 1.58 mm. A continuous strand of fiberglass yarn (250 yield fiberglass; Hybond 2079, PPG Industries) is threaded through the apparatus. A thermoplastic resin (polycarbonate resin; LEXAN® 140, General Electric Co.) is applied to the strand through the openings 22 at contact points 21 while the yarn is tracted through the assembly 10 at a speed of 1.5 meters/minute. The temperature of the applied resin is circa 250° C. and the surfaces 14 are maintained at the same temperature. The product resin impregnated strand comprises 35% by weight of resin and visual examination does not reveal any resin voids between glass fibers.

EXAMPLE 2

The procedure of Example 1, supra, is repeated except that the polycarbonate resin as used therein is replaced with a high molecular weight thermoplastic polyester of a mixture of terephthalic and isophthalic acids and a glycol (VALOX® 295, General Electric Company) is applied at a temperature of 220° C. The product is free of resin voids as judged by a visual examination.

The visual examination in Examples 1 and 2 is conducted with an eyepiece of 10 power.

What is claimed is:

1. An assembly for impregnating a continuous length of glass fibers with a polymeric resin, which comprises;
   a base member;
   a convex surface mounted on the base member and having a first contact point;
   a non-convex, surface positioned apart from and in association with the convex surface, said non-convex surface having a second contact point;
   said first and second contact points being on a path line along which the continuous length is free to travel;
   said path line extending both before and after each of the first and the second contact points;
   said path line changing direction toward the center of the arc of the convex surface at the first contact point;
   said path line changing direction away from the center of the second contact point;
   means for tracting the continuous length under tension along the extended path line, whereby the glass fibers are spread apart as the length changes direction at the first contact point and whereby the spread glass fibers are reconsolidated as the length changes direction at the second contact point; and
   means for applying the polymeric resin or a polymeric resin forming composition to the spread glass fibers.

2. The assembly of claim 1 which further comprises means for receiving and guiding the continuous length of fibers into the assembly, said means for receiving and guiding being a hollow body pierced by an oval aperature adapted by size and configuration to spread the fibers in the continuous length of fibers received as the continuous length is guided into the assembly.

3. The assembly of claim 1 wherein means for heating the fibers is associated with the convex surface.

4. The assembly of claim 1 including a die for discharge of the impregnated continuous length from the assembly.

5. The assembly of claim 1 wherein there are a plurality of convex surfaces alternating with a plurality of concave surfaces.

6. The assembly of claim 1 wherein the means for applying is a thermoplastic resin extruder and the resin is a thermoplastic resin.

7. The assembly of claim 6 which further comprises heating means for maintaining thermoplasticity of applied resin.

8. The assembly of claim 1 wherein the non-convex surface is concave.

9. The assembly of claim 1 wherein there are a plurality of convex surfaces, alternating with a plurality of non-convex surfaces.

* * * * *